US012669366B2

(12) United States Patent
Toohey

(10) Patent No.: US 12,669,366 B2
(45) Date of Patent: Jun. 30, 2026

(54) CHECKWEIGHER PERFORMANCE LEARNING SYSTEMS AND RELATED METHODS

(71) Applicant: Mettler-Toledo, LLC, Columbus, OH (US)

(72) Inventor: Patrick Toohey, Cortland, NY (US)

(73) Assignee: Mettler-Toledo, LLC, Columbus, OH (US)

( * ) Notice: Subject to any disclaimer, the term of this patent is extended or adjusted under 35 U.S.C. 154(b) by 560 days.

(21) Appl. No.: 18/201,574

(22) Filed: May 24, 2023

(65) Prior Publication Data

US 2024/0393161 A1 Nov. 28, 2024

(51) Int. Cl.
*G01G 23/01* (2006.01)
*G01G 11/00* (2006.01)
*G06F 17/14* (2006.01)
*G06N 5/022* (2023.01)

(52) U.S. Cl.
CPC ............. *G01G 23/01* (2013.01); *G01G 11/00* (2013.01); *G06F 17/142* (2013.01); *G06N 5/022* (2013.01)

(58) Field of Classification Search
CPC ........ G01G 23/01; G01G 23/00; G01G 11/00; G01G 19/035; G01G 19/03; G01G 19/02; G01G 19/00; G01G 23/10; G01G 23/06; G06F 17/142; G06F 17/141; G06F 17/14; G06F 17/10; G06F 17/00; G06N 5/022; G06N 5/02; G06N 5/00
See application file for complete search history.

(56) References Cited

U.S. PATENT DOCUMENTS

2003/0215100 A1* 11/2003 Kimura ................... G01G 3/147
                                                                     381/71.11
2012/0285218 A1* 11/2012 Inglin ..................... G01G 23/01
                                                                     73/1.13
2012/0285751 A1* 11/2012 Turner ................. G01G 19/005
                                                                     177/1
2016/0341597 A1* 11/2016 Crooks ................... G01G 23/00

FOREIGN PATENT DOCUMENTS

CN        108692799 B      4/2020
DE     102018121105 A1     3/2020
JP        11-311566 A     11/1999
JP         4101381 B2      6/2008
JP         6150379 B2      6/2017
JP         6177512 B2      8/2017
JP       2020-148589 A     9/2020

* cited by examiner

*Primary Examiner* — Mohamed Charioui
(74) *Attorney, Agent, or Firm* — Standley Law Group LLP; Jeffrey S. Standley; Adam J. Smith

(57) ABSTRACT

Checkweigher performance learning systems and methods are provided. Noise data for checkweighers is developed through a fast Fourier transform (FFT) trace of a load cell during operations of the checkweigher. Accuracy data is generated through validation operations of the load cells. Configuration and operations data, including the noise and accuracy data, is received for the checkweighers at one or more servers which classify the noise data by component based on frequency, correlate the accuracy data with magnitude values of the noise data on a component-specific basis to determine a magnitude threshold for each component providing acceptably accurate readings, and generate an alert where a magnitude of the noise data for a given component of a given one of the checkweighers is above the magnitude threshold for the given component.

16 Claims, 10 Drawing Sheets

34

| MAKE/ MODEL | SERIAL NO. | PULLEY DIA. | BELT LENGTH | FRAME CONFIG. | OBJECT TYPE | BELT SPEED | LOAD CELL | NOISE FREQ. 1 | NOISE MAG. 1 | NOISE FREQ. N | NOISE MAG. N | ACCURACY | VALIDATED | CAUSE OF FAILURE |
|---|---|---|---|---|---|---|---|---|---|---|---|---|---|---|
| COMPANY X, MODEL Y | 12345 | 1.5" | 5' | TABLE | PHARMA. PKG. | 4 MPH | TYPE X | X HZ | A | H HZ | F | 98% | YES | N/A |
| COMPANY X, MODEL Z | 23456 | 3.5" | 5' 3" | SUPPORT LEGS | PHARMA. PKG. | 4 MPH | TYPE Q | Y HZ | B | G HZ | G | 99% | YES | N/A |
| COMPANY A, MODEL B | 34567 | 4" | 4' | SQUARE WELDED | FOOD PKG. | 7 MPH | TYPE R | Z HZ | C | Q HZ | H | 95% | NO | WORN PULLEY |
| COMPANY C, MODEL D | 45678 | 5" | 3' | TABLE | FOOD PKG. | 5 MPH | TYPE Z | A HZ | D | E HZ | I | 98% | YES | N/A |
| COMPANY C, MODEL E | 56789 | 5" | 3.5' | SUPPORT LEGS | MAIL | 4 MPH | TYPE Y | X HZ | E | R HZ | J | 94% | NO | MOTOR OFF SPEED |

MODEL PARAMETER(S)

PREDICTED ACCURACY (PERCENT)

CHECKWEIGHER PERFORMANCE LEARNING SYSTEMS AND RELATED METHODS

CROSS-REFERENCE TO RELATED APPLICATIONS

This application is a filed as original and makes no priority claim.

TECHNICAL FIELD

Exemplary embodiments relate generally to learning systems and methods for evaluating checkweigher performance and predicting accuracy.

BACKGROUND AND SUMMARY OF THE INVENTION

Checkweighers are used to measure the weight of objects, such as those passing along a conveyor. From time to time, it is helpful to validate the accuracy of such checkweighers. Certain techniques for validation are known, including those described in US Pub. No. 2012/0285218 published Nov. 15, 2012 (the "218 Publication"). A number of factors may affect the accuracy of a checkweigher, and in various situations a checkweigher may become less accurate over time, such as due to normal wear and tear. It would be helpful to understand the factors affecting accuracy to identify checkweighers likely experiencing accuracy issues, identify likely contributors to such inaccuracies, and/or predict checkweigher accuracy under a variety of configurations.

Systems and methods for evaluating and learning from checkweigher performance data, such as to identify checkweighers likely experiencing accuracy issues, identify likely contributors to such inaccuracies, and/or predict checkweigher accuracy under a variety of configurations, are provided. Information for a large number of checkweighers, which may be of a same or different type, may be gathered. Such information may be gathered and provided at manufacture and/or from field deployed checkweighers, by way of non-limiting example. The information may be centralized in a shared, editable dataset in exemplary embodiments, without limitation.

The information may include checkweigher configuration information. The checkweigher configuration information may include characteristics and/or other information regarding any component, such as those components likely to produce noise when operated, such as but not limited to, pulley diameter, belt length, belt speed, product type, load cell type, frame construction, combinations thereof, or the like. The information may include checkweigher noise data. The checkweighers may be evaluated under various operating conditions, such as without any objects for weighing, during normal weighing operating conditions (with well performing components and/or worn components), and/or during validation operations. The noise data may be gathered by performing a trace of load cell data under such conditions. The noise data may be processed using a Fourier transform, such as a fast Fourier transform ("FFT"). The noise data may be classified by component, such as based on frequency of the noise data. Stated another way, each component may be associated with a frequency or frequency range. The magnitude of the noise data may be determined, such as for each component/frequency classification.

Certain portions of the data may be identified as providing acceptably accurate readings. For example, certain of the data may be associated with normal operations and/or validation operations which resulted in acceptably accurate readings. Other portions of the data may be identified as providing unacceptably accurate readings. For example, certain of the data may be associated with normal operations and/or validation operations which resulted unacceptably inaccurate readings. An acceptable magnitude threshold may be established for each component/frequency classification, such as by linear regression and/or other statistical or machine learning technique of the noise data associated with acceptably accurate and unacceptable inaccurate readings. The data may be updated with acceptably accurate or unacceptably inaccurate reading indications following validations of checkweighers.

Certain portions of the data associated with unacceptably inaccurate readings may include an indication of the component(s) contributing to such inaccuracy (e.g., worn belt, roller out of balance, motor operating off speed, etc.). Classifications of magnitudes associated with certain known failure points may be developed. The data may be updated with indication of the component(s) contributing to such inaccuracy following performance of diagnostics and/or maintenance on such checkweighers.

Subsequent checkweigher data may be gathered and/or processed to identify checkweighers likely encountering accuracy issues. In exemplary embodiments, without limitation, checkweigher data with a noise magnitude above the acceptable magnitude threshold for a given component/frequency may be identified. In this fashion, potentially inaccurate checkweighers may be rapidly identified, along with the component(s) likely contributing to such inaccuracies. Validations may be subsequently performed to determine if the identified checkweigher is truly weighing inaccurately and/or diagnostics or maintenance may be performed on the identified checkweigher or component thereof to determine which component contributed to such inaccuracies or if the identified component was the contributor to such inaccuracies. Results may be fed into the model to further refine the magnitude thresholds and/or classifications.

In exemplary embodiments, without limitation, the model may be used to predict accuracy of a given checkweigher, whether actually in existence or not. Some or all of the checkweigher information in the data set may be provided and processed, such as by way of linear regression analysis, to determine a predicted accuracy based on various checkweigher configurations. Checkweigher configuration information may be subsequently provided to determine a predicted accuracy of a given checkweigher. Validation testing of a so-configured checkweigher may be performed. Where the so-configured checkweigher fails to provide a measurement reading within a predetermined tolerance of the predicted accuracy, an electronic notification may be generated. In this fashion, underperforming checkweighers may be quickly identified.

Exemplary embodiments of the invention may include a checkweigher performance learning system including checkweighers, each comprising at least: a conveyor, a load cell, and a controller configured to generate noise data through a fast Fourier transform (FFT) trace of the load cell during operations of the checkweigher and generate accuracy data through validation operations for the load cell. One or more servers are in electronic communication with the checkweighers and include software instructions, which when executed, configure the one or more servers to, receive configuration data for the checkweighers, receive operations data from the checkweighers including the noise data and the accuracy data, classify the noise data by component based on frequency of the noise data, correlate the accuracy data with magnitude values of the noise data on a component-specific basis to determine a magnitude threshold for each component providing acceptably accurate readings, for each of the magnitude thresholds exceeded for a respective component of a respective checkweigher, classify the noise data for the respective component by comparison to known, fault conditions for the respective component to generate a predicted fault condition, and generate an alert comprising the predicted fault condition.

In exemplary embodiments, without limitation, one or more models may be used to classify conditions experienced to identify and/or predict a root cause of noise. The dataset may comprise examples of noise data when various, known conditions exist and/or when only acceptable levels of noise exist. In this way, the software instructions, which when executed, configure the one or more servers to receive data and compare the received noise signature or other data to the stored examples. Where the received data is within a predetermined margin of one or more stored examples, the underlying, predicted root condition may be displayed or transmitted (e.g., acceptable, worn belt, unbalanced pulley, damaged loadcell, etc.). This analysis may be triggered where a received magnitude of the noise data for a given component of a given one of the checkweighers is above the magnitude threshold for the given component.

The one or more servers may be configured to determine the magnitude threshold for each component by performing a linear regression analysis of the noise data on a component-specific basis.

The one or more servers may be configured to receive user input regarding a proposed checkweigher configuration and generate a predicted accuracy for the proposed checkweigher configuration.

The one or more servers may be configured to generate the predicted accuracy for the proposed checkweigher configuration by performing a linear regression analysis of the correlated data, and fitting the proposed checkweigher configuration to the linear regression analysis to provide the predicted accuracy.

The one or more servers may be configured to generate an alert where accuracy data of one of the checkweighers having the proposed checkweigher configuration is below the predicted accuracy level by a predetermined margin.

The one or more servers comprises historical operations data portions of which are associated with known fault conditions, and the one or more servers may be configured to identify the predicted fault condition by matching the noise data associated with the exceeded magnitude threshold to a given one of the known fault conditions in the historical operations data having a frequency and magnitude within a predetermined margin of the frequency and magnitude data of the given one of the known fault conditions in the historical operations data, receive feedback regarding actual diagnosed conditions for the checkweigher for which the alert is generated, and update at least the predetermined margin of the frequency and magnitude data for the given one of the known fault conditions for the respective component at the one or more machine learning techniques in accordance with the feedback.

The configuration data may include pulley diameter, belt length, object type, belt speed, and frame configuration.

User devices may be electronic communication with the one or more servers, wherein the one or more servers are configured to publish an electronically sharable and editable table at the user devices on an on-demand basis, said table comprising the configuration data and the operations data for the checkweighers.

The one or more servers may be configured to receive additional configuration data and operations data for the checkweighers from the user devices and update the table with the additional configuration data and operations data.

The one or more servers may be configured to receive known fault condition information for the checkweighers from the user devices, update the table with the known fault condition information in association with at least certain of the configuration data and operations data, and establish magnitude classifications for the known fault conditions.

The FFT trace data may comprise belt noise, roller/pulley noise, combinations thereof, or the like. Where multiple belts are utilized, the data may particularly pertain to those in contact with the loadcell.

A method for predicting checkweigher accuracy may include electrically receiving configuration data for checkweighers, performing a fast Fourier transform (FFT) trace of load cells of the checkweighers during operations comprising normal operations and accuracy validation operations to develop noise data and accuracy data for the checkweighers, electronically classifying the noise data by component based on frequency and correlating the accuracy data with magnitudes of the noise data to determine threshold magnitudes on a component-specific basis reflecting acceptably accurate readings.

The method may include electronically receiving further noise data, electronically classifying the further noise data by component based on frequency, and generating an alert where the further noise data includes a magnitude above the threshold for any of the components.

The thresholds may be determined by electronically performing a linear regression analysis of the noise data for each component.

The method may include performing a linear regression analysis of the correlated accuracy and configuration data, receiving user input for a proposed checkweigher configuration, and generating a predicted accuracy for the proposed checkweigher configuration based on the linear regression analysis.

The method may include receiving accuracy data from an additional checkweigher having the proposed checkweigher configuration, determining that the accuracy data from the additional checkweigher data is not within a predetermined margin of the predicted accuracy, and generating an alert indicating that the additional checkweigher is not performing with an expected level of accuracy.

The method may include receiving indicators of known fault conditions for at least some of the noise data, receiving additional checkweigher noise data, electronically classifying the additional checkweigher noise data by component based on frequency, determining that the additional checkweigher noise data for any of the components is within a margin of the noise data associated with at least one of the known fault conditions for a given component, and generating an alert indicating the at least one of the known fault conditions is a likely fault condition for the additional checkweigher. Such classification may be provided using one or more machine learning techniques.

These machine learning techniques may be used to improve subsequent classifications, such as by providing feedback to the servers to update the model(s) upon receipt of manually entered data regarding actually diagnosed conditions for the checkweighers. For example, without limitation, various weightings, classification criteria, magnitude thresholds, combinations thereof, or the like may be automatically adjusted by the one or more machine learning techniques after provided with such feedback and applied to subsequent classifications to improve the modeling.

The configuration data may include pulley diameter, belt length, object type, belt speed, and frame configuration, and the FFT trace data comprises belt noise and pulley noise.

The method may include electronically publishing the accuracy data and the noise data in an editable table, wherein the configuration data is provided by manufacturers after creating the checkweighers, and the noise data is provided by a respective customer during use of checkweighers.

In other exemplary embodiments, without limitation, a checkweigher performance learning system may include checkweighers, each comprising at least: a conveyor, a load cell, a controller configured to perform a fast Fourier transform (FFT) trace of the load cell to derive noise data and perform a validation of the load cell to derive accuracy data, user devices, and one or more servers in electronic communication with the controller each of the checkweighers and the user devices, said one or more servers comprising software instructions, which when executed, configure the one or more servers to: receive configuration data for the checkweighers from the user devices, receive the noise data and the accuracy data from the controllers of the checkweighers, classify the noise data by component based on frequency of the noise data, correlate the accuracy data with magnitudes of the noise data for each component, publish the correlated data to an electronically sharable and editable document (e.g., spreadsheet, dataset, and/or any digital format), receive known fault condition information from the user devices and update associated entries of the correlated data with the known fault information, perform a linear regression analysis of the noise data for each component to develop a magnitude threshold for each component differentiating between the magnitudes associated with the accuracy data above a predetermined acceptable accuracy threshold and the magnitudes associated with the accuracy data below the predetermined acceptable accuracy threshold, receive additional noise data and classify the additional noise data by component based on frequency, generate an alert if the additional noise data incudes a magnitude above the magnitude threshold for any of the components, and include, in the alert, an indicator of a likely fault where the magnitude of the additional noise data for a given component is within a predetermined margin of a magnitude of the correlated data associated with one of the known fault conditions for the given component.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 4 is an exemplary table of checkweigher data produced by the method of FIG. 3;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
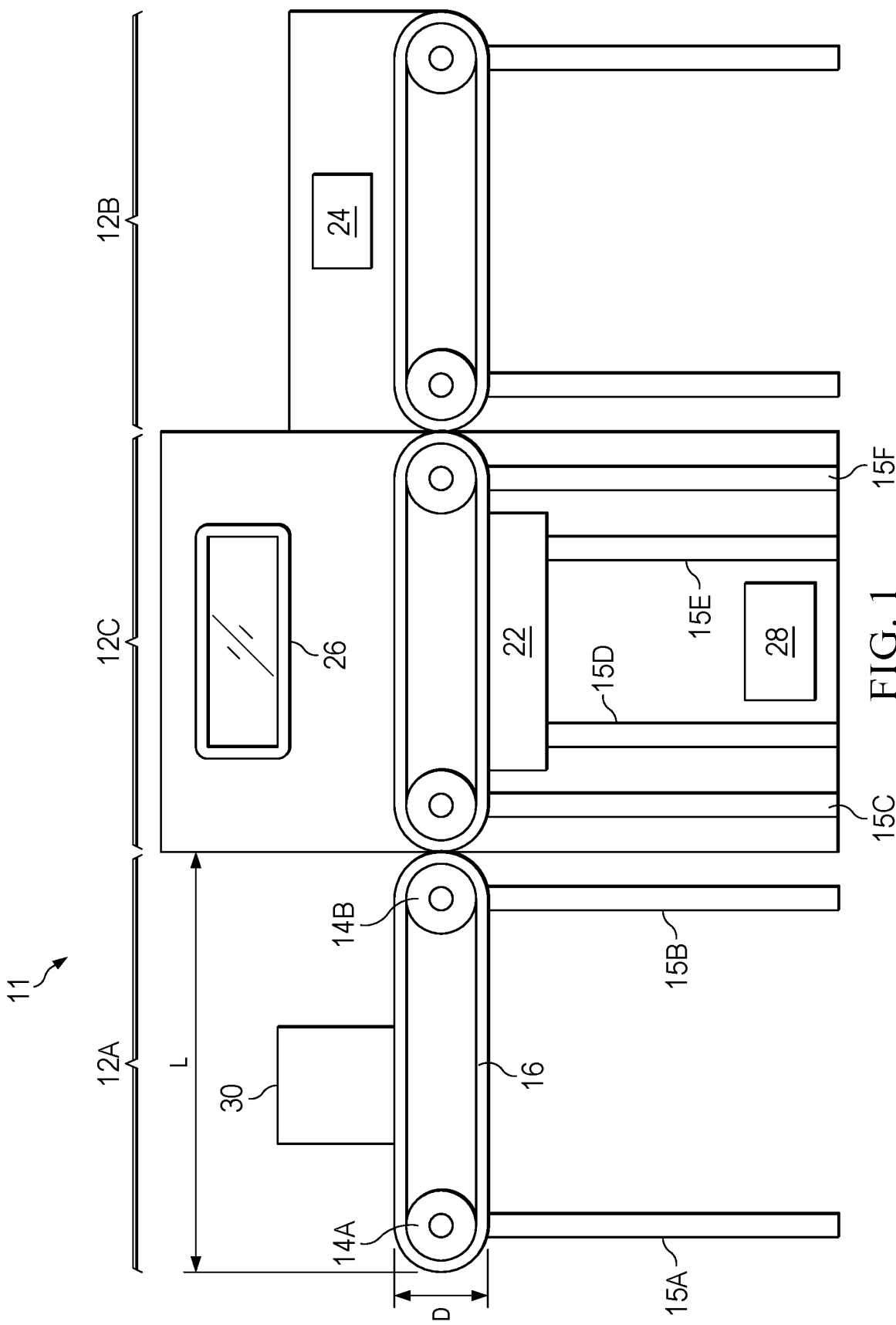
FIG. 1 is front view of an exemplary checkweigher of the checkweigher performance learning system.

FIG. 1 illustrates an exemplary checkweigher 11 for a checkweigher performance learning system 10 (hereinafter also the "system") illustrated in FIG. 2, which may include one or more of the checkweighers 11. Each of the checkweighers 11 may include one or more conveyors 12A, 12B, 12C configured to move objects 30 to or away from a load cell 22. Any type, kind, or number of checkweighers 11 may be utilized.

Each of the conveyors 12 may comprise one or more pulleys 14A, 14B for a belt 16. One or more of the pulleys 14 may be motorized or otherwise powered, such as to cause movement of the belt 16. The conveyors 12 may include one or more rollers along the belt 16, though such are not required. The conveyors 12 may comprise one or more frame elements 15A, 15B, 15C, 15D, 15E, 15F. The frame elements 15 may comprise members, tables, support arms, combinations thereof, or the like. The frame elements 15 may be configured to support one or more of the pulleys 14, the rollers 16, the belt 16, and/or the load cell 22, directly or indirectly. The frame elements 15 may be of particular configuration, arrangement, and/or type.

Any type, kind, number, and/or arrangement of conveyors 12 may be utilized. The conveyors 12 may be selected and/or configured to accommodate particular types and/or kinds of objects 30, though such is not necessarily required.

One or more load cells 22 may be connected (directly or indirectly) to a given one or more of the conveyors 12 to measure the weight of the objects 30 as they move across the conveyor(s) 12C. In this fashion, the weight of the objects 30 may be measured while they are in motion.

The load cell(s) 22 may be in electronic communication with one or more controllers 28. The controllers 28 may comprise one or more electronic storage devices, one or more processors, and/or software instructions stored at the one or more electronic storage devices, which when executed, configure the one or more processors to perform the functions and/or provide the features shown and/or described herein.

The checkweigher 11 may comprise one or more object dispositioning devices 24. The controller(s) 28 may be in electronic communication with the object dispositioning devices 24. The object dispositioning devices 24 may comprise arms, compressed air outlets, push rods, gates, combinations thereof, or the like. The object dispositioning devices 24 may be configured to selectively allow objects to pass, such as onto a subsequent, outfeed conveyor, or may move the objects 30, such as to a rejection area, based on commands received from the controller(s) 28. The controller(s) 28 may be configured to command the object dispositioning devices 24 to reject objects 30 outside of a target weight as measured by the load cells 22 and/or allow the objects 30 to proceed (or otherwise command the object dispositioning devices 24 to disposition the objects 30 for acceptance) where the target weight as measured by the load cells 22. The target weight may be a maximum, minimum, range, weight with tolerance, combinations thereof, or the like. The target weight may be object 30 type specific.

The checkweigher 11 may comprise one or more electronic displays 26 for displaying information about the checkweigher 11, including operations status, measured target weight, summary disposition information, user preferences, combinations thereof, or the like. The electronic display(s) 26 may comprise touch screens and/or user input devices (e.g., keyboards) may be provided for accepting user input in this regard.

The checkweigher 11 may be configured to selectively provide accuracy validations. Such accuracy validations may be performed as shown and/or described in the '218 Publication, the entirety of which is hereby incorporated by reference as if fully restated herein. The checkweigher 11 and/or related equipment may be as shown and/or described in the '218 Publication.

The controller(s) 28 may be local to each checkweigher 11 and/or remote therefrom. The system 10 may comprise multiple checkweighers 11A, 11B, 11C, 11D. Any number of checkweighers 11 of the same or different types may be utilized.

In exemplary embodiments, without limitation, some or all of the checkweighers 11 may comprise one or more network communication devices for communicating data by way of one or more networks 32 to one or more remotely located servers 36. The network communication devices may be part of the controller(s) 28, or separate therefrom. The networks 32 may include, for example without limitation, one or more internets (e.g., the world wide web), intranets, cellular networks, near field communication networks, local area networks, combinations thereof, or the like.

Figure 2:
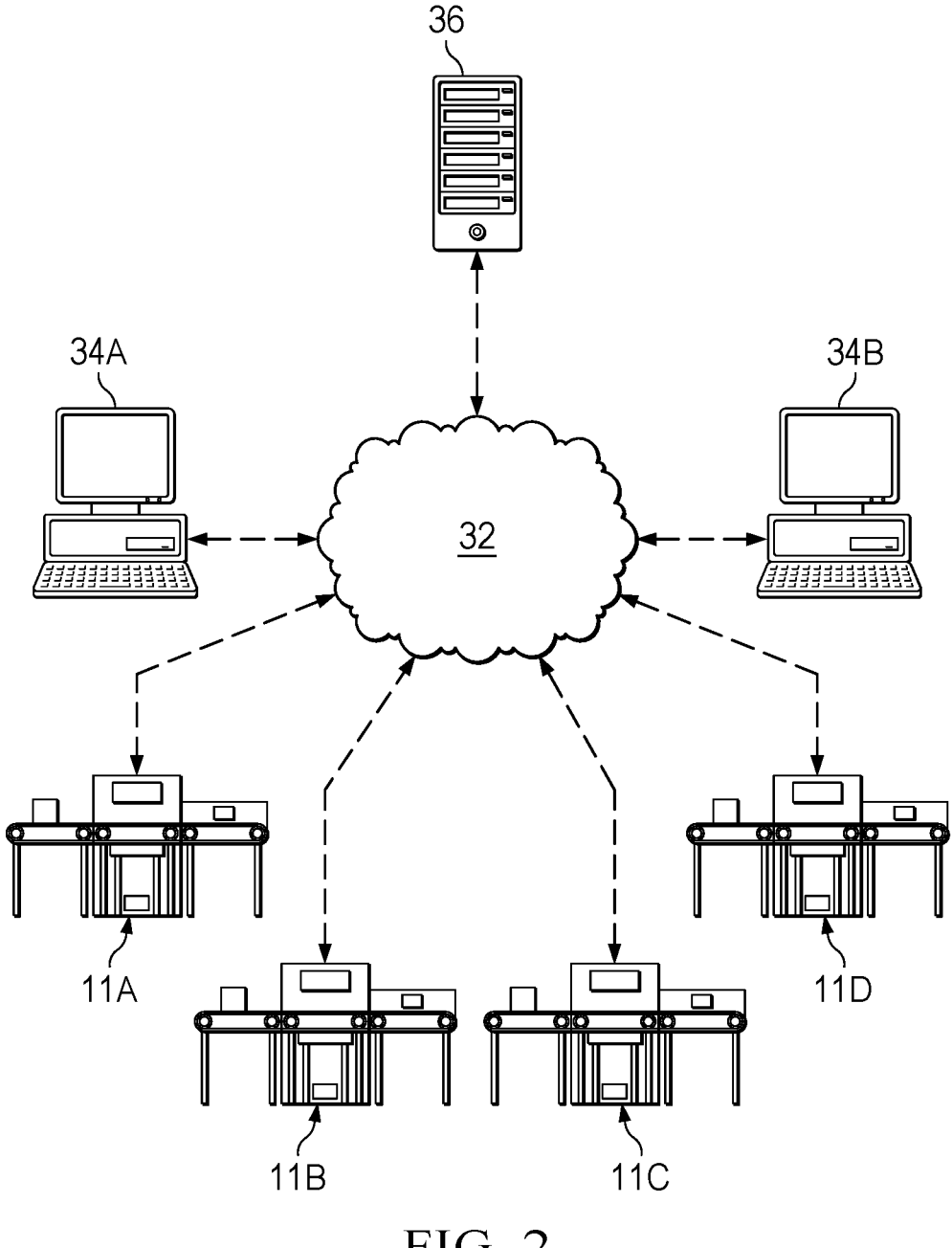
FIG. 2 is a plan view of the checkweigher performance learning system with multiple exemplary checkweighers.

As illustrated with particular regard to at least FIG. 2, the checkweigher performance learning system 10 may include multiple exemplary checkweighers 11. The system 10 may also include one or more user devices 34A, 34B. The user devices 34 may be associated with customer, users, manufacturers, operators, maintenance technicians, combinations thereof, or the like of the system 10 and/or checkweigher(s) 11. The user devices 34 may comprise personal computers, servers, smartphones, tablets, combinations thereof, or the like. The user devices 34 may be connected to the network(s) 32 and/or server(s) 36. The server(s) 36 may act as the controller(s) 28, through such is not necessarily required. The server(s) 36 may be in electronic commination with some or all of the controller(s) 28 of the checkweighers 11 and/or the user devices 34. The server(s) 36 may be configured to receive data from the checkweighers 11 and/or the user device 34, such as to generate and/or update a shared data set as further shown and/or described herein.

Figure 3:
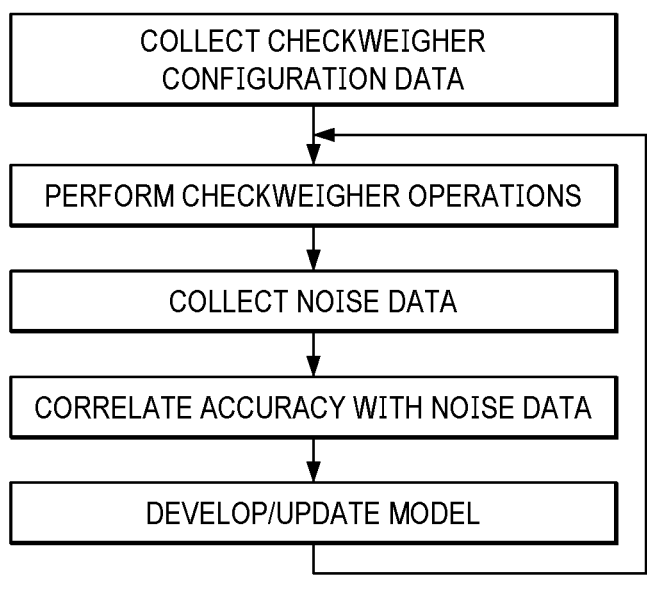
FIG. 3 is a flow chart with exemplary logic for developing a checkweigher accuracy model from the checkweigher performance learning system.

FIG. 3 illustrates an exemplary method for operating the system 10. Information about the checkweighers 11 may be provided. The information may include certain configuration and/or operations information for the checkweighers 11. The information may include, for example without limitation, manufacturer, model, serial number, frame 15 configuration, pulley 14 type and/or diameter D, belt 16 type and/or length L, belt 16 speed, object 30 type, load cell 22 type combination thereof, or the like. Any type or kind of information which may affect noise and/or accuracy of the checkweigher 11 may be provided. Such information may be provided electronically to the server(s) 36. The checkweigher 11 information may be stored at the server(s) 36 in one or more data sets. For example, without limitation, the checkweigher 11 information may be organized into one or more tables, an example of which is provided at FIG. 4, without limitation. The type, kind, arrangement, and values provided are merely exemplary and are not intended to be limiting. The data set may be electronically published and/or may be configured to be shared and/or edited, such as by way of the user devices 34.

The checkweighers 11 information may be provided automatically, such as but not limited to, based on information stored or otherwise recorded at the controller(s) 28 regarding the checkweighers 11. Alternatively, or additionally, the checkweigher 11 information may be provided at the server(s) 36 and electronically associated with the checkweighers 11, such as by way of manual entry at the user devices 34. For example, without limitation, the checkweigher 11 information may be provided by a manufacturer or supplier of the equipment, a customer, user, and/or operator following purchase and/or installation, or the like.

At least some of the checkweigher 11 information may be updated and transmitted periodically during use of the checkweighers 11, such as information which changes with operation. Such information may include, for example without limitation, belt 16 speed, object 30 type, and the like. As another example, without limitation, where components are changed (e.g., different motor installed, new load cell 22 installed, roller or conveyor size changed, etc.), updates may be provided to the data set. Regardless, the checkweigher 11 information may be queried and retrieved as needed.

Checkweigher 11 operations may be performed. The operations may include operating the checkweigher 11 without any objects 30 to be measured, such as to establish one or more baseline noise measurements. The operations may include, alternatively or additionally, normal operations where various objects 30 are weighed. The operations may include, alternatively or additionally, checkweigher 11 validations, such as shown and/or described in the '218 Publication by way of non-limiting example.

The controller(s) 28 may be configured to collect noise data during such operations. In exemplary embodiments, without limitation, a Fourier transform, such as but not limited to a fast Fourier transform ("FFT"), trace of the load cell(s) 22 may be provided, such as before, during, and/or after such operations to generate the noise data.

Accuracy of the checkweighers 11 may be electronically correlated with the noise data. The accuracy of the checkweighers 11 may be determined from the validation operations, such as but not limited to performance of those shown and/or described in the '218 Publication.

The gathered information, including but not limited to the checkweigher 11 information and/or noise data, may be placed into the data set, such as but not limited to, in the form of the table of FIG. 4. In exemplary embodiments, without limitation, certain of the gathered or otherwise provided information may be associated with an acceptably accurate indicator and/or an unacceptably inaccurate indicator and/or a cause of failure indication. In this fashion, data known to be associated with accurate readings may be differentiated from data known to be associated with inaccurate readings. Furthermore, a believed cause of such inaccuracies may be tracked. As further discussed herein, such information may be used to establish frequency/component specific noise magnitude thresholds believed to result unacceptably inaccurate readings and/or frequency/component specific noise magnitude classifications believed to be caused by certain fault conditions.

Figure 5:
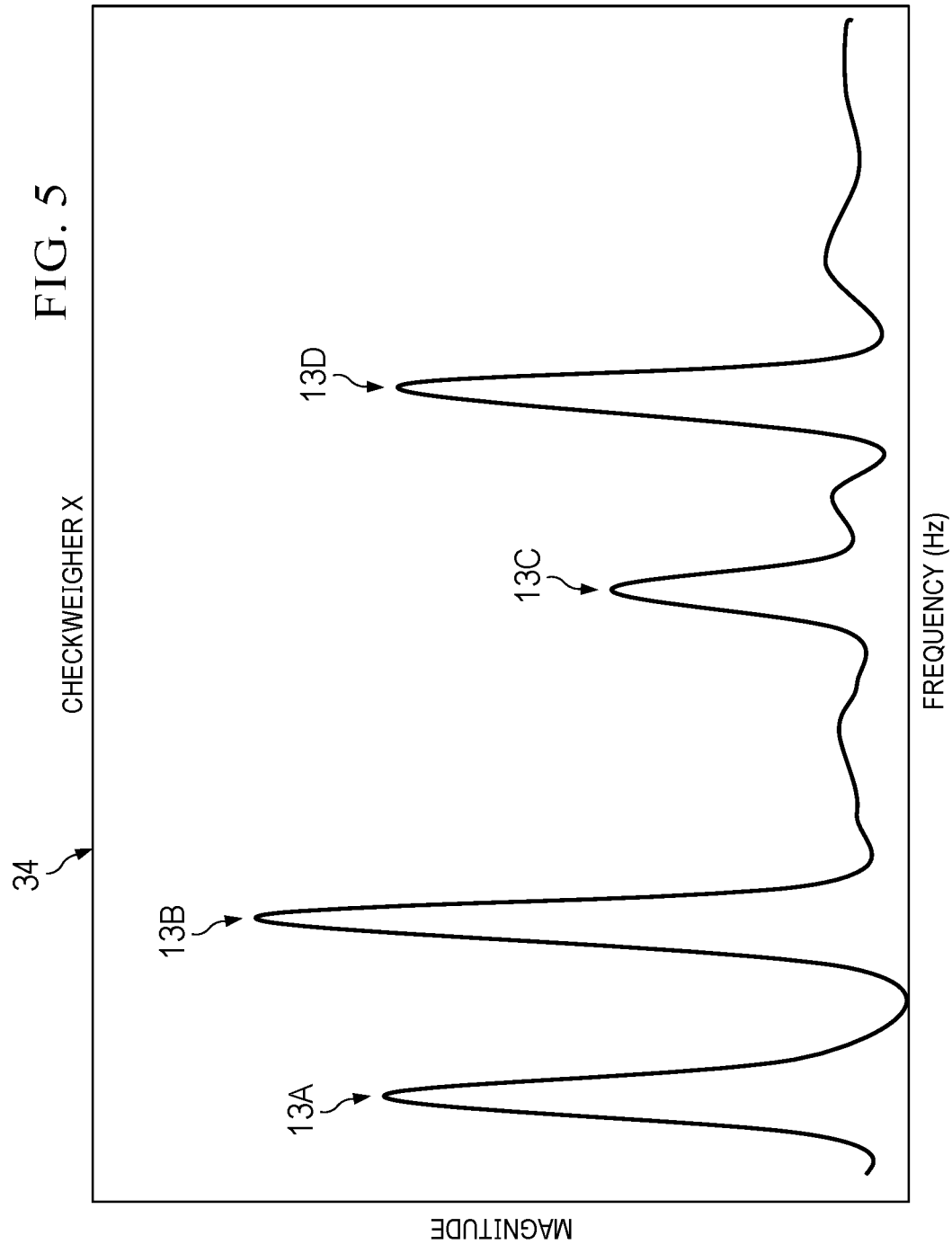
FIG. 5 is an exemplary graph of checkweigher noise data produced by the method of FIG. 3.

The data may be graphically displayed or represented, such as in the form of the graph of FIG. 5. Each spike 13A, 13B, 13C, 13D may be associated with a given component (e.g., pulley 14, belt 16, motor, etc.) of a checkweigher 11. For example, each component may produce noise at a given frequency or frequency range, and component may provide such noises at a given magnitude at that frequency or frequency range. The graph illustrates exemplary noise data from a given one of the checkweighers 11 or multiple ones of the checkweighers 11 on a purely illustrative basis, without limitation.

Figure 6:
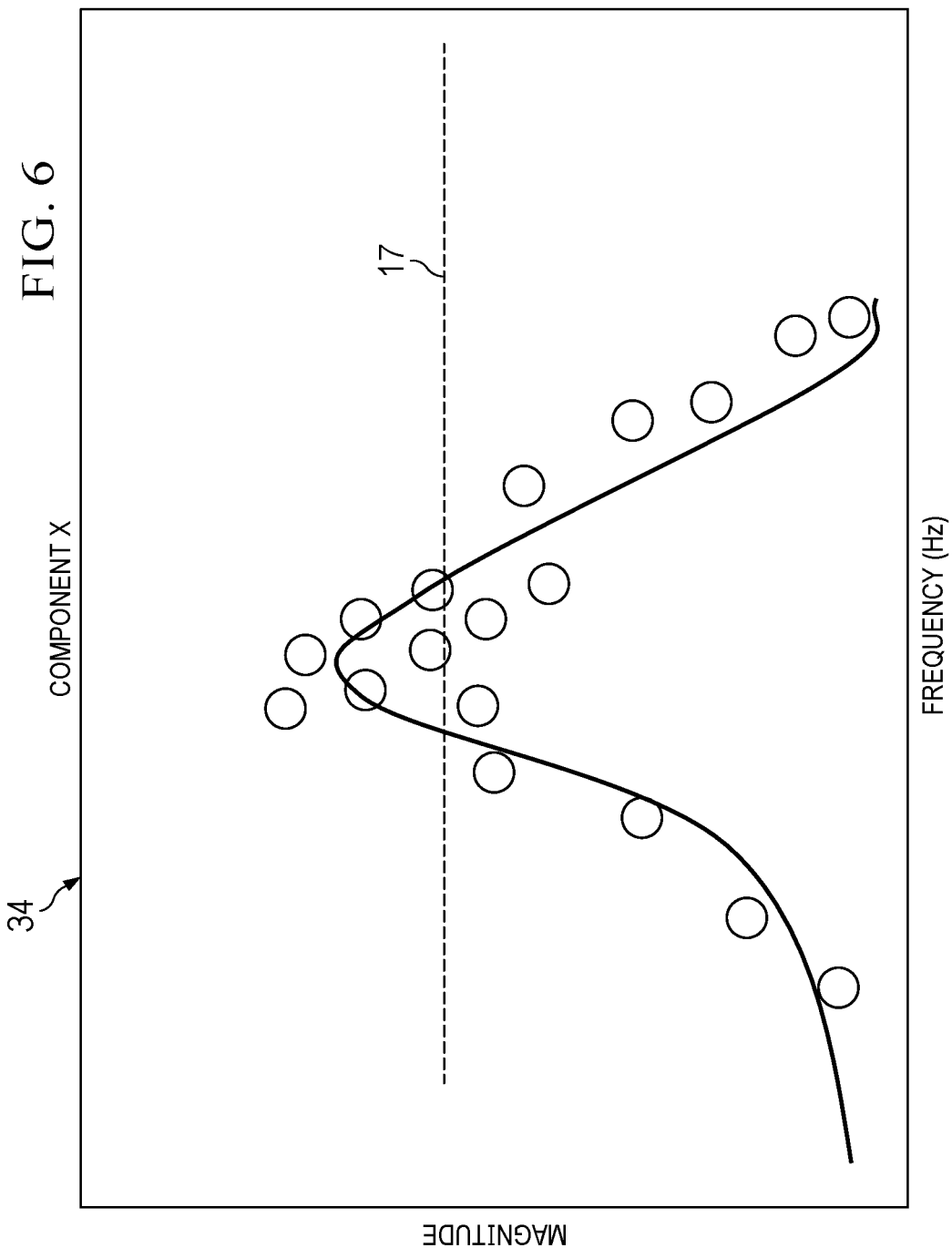
FIG. 6 is an exemplary component-specific graph of the checkweigher noise data.

The noise data may be graphically displayed or represented, such as in the form of the graph of FIG. 6, which may be component specific to a single one or multiple ones of the checkweighers 11. In exemplary embodiments, without limitation, measurements for a same or similar components (e.g., pulleys 14, etc.) of multiple checkweighers 11 may be analyzed by linear regression and/or other statistical or machine learning technique determine normal and abnormal readings and/or exemplary frequencies or frequency ranges for the component. The graph illustrates exemplary noise data on a purely illustrative basis, without limitation.

The data set, tables, and/or graph(s), and/or underlying data thereof, may be electronically published and may be sharable and/or editable. In exemplary embodiments, without limitation, the data set may be stored, shared, and/or edited at the server(s) 26 by way of the user devices 34. Some or all of the information may be automatically provided and/or updated, some or all of the information may be manually entered. The data collected and processed may illustrate various noise components of the checkweighers 11, such as but not limited to, pulley 14 noise. The type, kind, arrangement, and values provided are merely exemplary and are not intended to be limiting.

Figure 7:
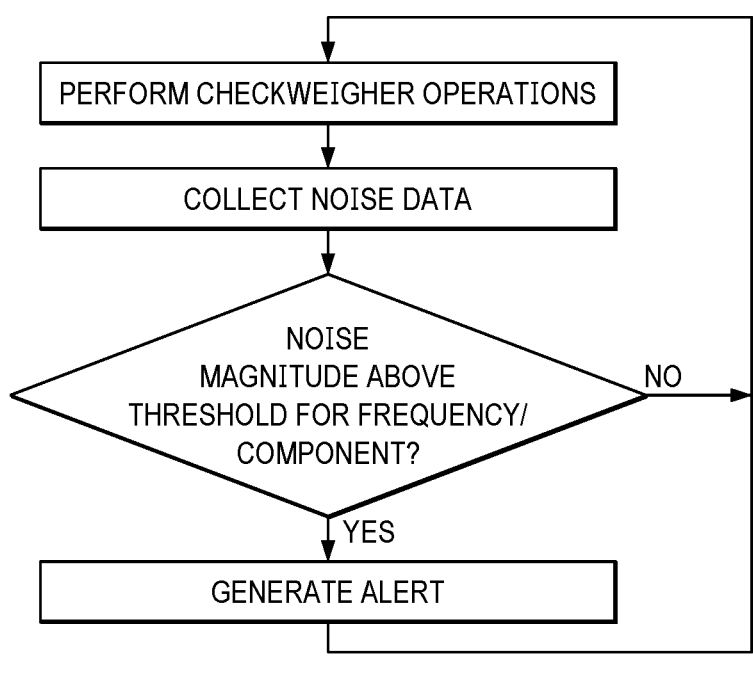
FIG. 7 is a flow chart with exemplary logic for utilizing the checkweigher accuracy model.

A magnitude threshold 17 may be established, such as on a component/frequency specific basis. For example, without limitation, the magnitude thresholds 17 may be specific to component size, features (e.g., number of teeth), operational characteristics (e.g., rotating at a specific velocity), combinations thereof, or the like. As illustrated in FIG. 7, data readings above the threshold 17 may be associated with failures or likely inaccuracies of the checkweigher 11. An electronic alert may be generated for such checkweighers 11. Data readings below the threshold 17 may be associated with likely accurate checkweighers 11. Alerts may be automatically generated and/or transmitted from the server(s) 36 to user device(s) 34 associated with the flagged checkweighers 11.

Various magnitude classifications, such as on a component/frequency specific basis, may be established for various fault conditions (e.g., pulley 14 out of balance when measuring a particular object 30 at a particular speed based on higher roller noise than expected, worn belt, motor operating off speed, etc.). The data set may include indicators of likely causes of inaccuracies, such as may be deliberately provided in testing operations and/or during diagnostics or maintenance of checkweighers 11 experiencing unacceptably inaccurate readings by way of non-limiting example. In this fashion, the data set may be generated and/or updated to include categories for various fault conditions. When comparable data is subsequently received, the system 10 may be configured to classify the data into the relevant category and generate an alert that a similar condition may be present. Where a classification of a likely cause of inaccuracy is determined, such as at the server(s) 36, the alerts may include an indicator of the likely cause of inaccuracy.

The magnitude thresholds 17 may be developed at the server(s) 36 in exemplary embodiments on an automated basis. In exemplary embodiments, without limitation, the magnitude thresholds 17 may be set to differentiate between the noise data indicated as providing acceptably accurate readings and unacceptably inaccurate readings. Statistical analysis, such as but not limited to bell curve fitting, standard deviations, mean, median, mode, combinations thereof, and the like, may be applied to exclude outlier data. As additional data is received, the magnitude thresholds 17 may be updated, such as but not limited to by way of one or more machine learning techniques.

In exemplary embodiments, without limitation, the indicators of acceptably accurate readings or unacceptably inaccurate readings and/or believed cause of failure information may be used to determine if a given data reading is a useful indicator of checkweigher 11 accuracy/inaccuracy and/or source of failure using various machine leaning techniques such as, but not limited to, linear regression, neural network, decision tree, combinations thereof, or the like. For example, without limitation, where a given magnitude for a specific frequency/component is above a current magnitude threshold 17, but subsequent validation determines that the checkweigher 11 is weighing in an acceptable accurate fashion, the magnitude threshold 17 may be raised, such as to the given magnitude. As another example, without limitation, where a given magnitude is below a current magnitude threshold 17, but subsequent validation determines that the checkweigher 11 is weighing in an unacceptably inaccurate fashion, the magnitude threshold 17 may be decreased, such as to the given magnitude. As yet another example, without limitation, where a source of inaccuracy is determined, subsequent readings for the given, or similar, frequency and magnitude (e.g., within a given range thereof) may be classified as likely caused by the same source (e.g., worn pulley, motor operating off speed, stretched belt 16, frame 15 instability, etc.).

As additional checkweigher 11 configuration information and/or operations data is gathered, the dataset may be updated. The dataset may be automatically and/or manually updated, such as during some or all validation runs of some or all of the checkweighers 11. For example, without limitation, based on selected user preferences, validation and other information may be automatically shared from each of the checkweighers 11 to the server(s) 36 by way of the network(s) 32. The dataset may, alternatively or additionally, be updated by data manually provided at the one or more user devices 34. The model, including the magnitude thresholds 17 and/or classifications, may be updated based on the updated dataset. Updates to the data set may include, for example without limitation, removing outlier data, adding new data gathered, updating existing data where validation is performed and/or cause of inaccuracy is determined, combinations thereof, or the like.

Figure 8:
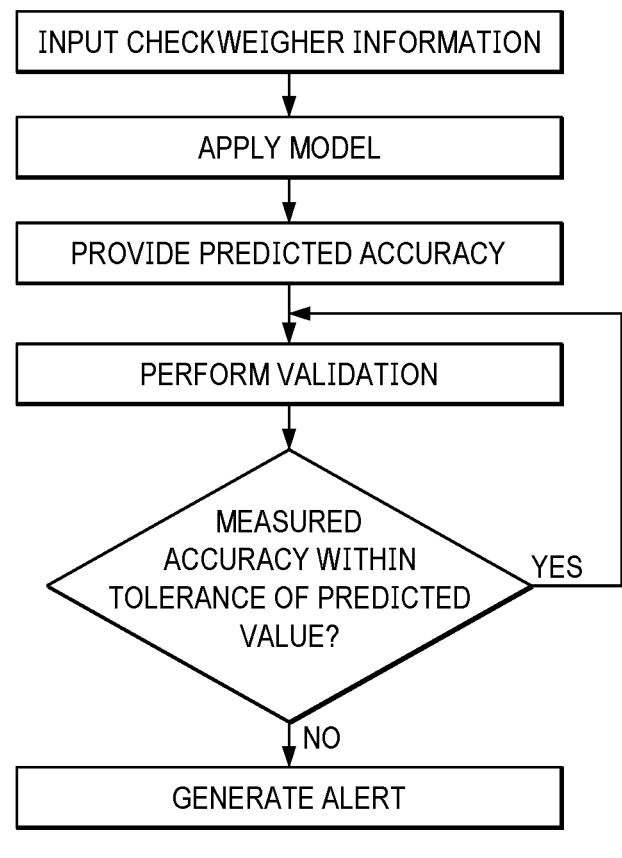
FIG. 8 is a flow chart with exemplary logic for predicting checkweigher accuracy from the checkweigher performance learning system.

FIG. 8 illustrates an exemplary method for predicting accuracy of a given checkweigher 11 and monitoring for unexpected accuracy readings. Information about the checkweigher 11 may be provided, such as to the server(s) 36 from the user devices 34. The information may include any type or kind of information, such as, but not limited to, manufacturer, model, serial number, frame 15 configuration information, pulley 14 type and/or diameter D, belt 16 type and/or length L, belt 16 speed, object 30 type, load cell 22 type, combinations thereof, or the like. The checkweigher 11 may be classified, such as by the server(s) 36 based on the provided information. In exemplary embodiments, without limitation, classification may be performed by querying the dataset for comparable information and/or fitting the provided information to a linear regression model. This may provide a predicted accuracy for the provided checkweigher 11 configurations. The predicted accuracy may be graphically outputted to the user, such as at the user devices 34. In this fashion, accuracy may be predicted for a variety of checkweighers 11 in a variety of configurations may be simulated and/or otherwise generated. This may assist a user in selecting a checkweigher 11 or particular configuration thereof. The configuration information may be reflective of checkweighers 11 in existence or not. Where no exact information is available in the data set, the closest matching configurations may be utilized, which may be combined from multiple checkweighers 11, such as but not limited to by averaging.

Validation run(s) may be performed of the checkweighers 11 and compared to predicted accuracies. If the measured accuracy is within a tolerance of the predicted value, no alerts may be generated. If the measured accuracy is outside of a tolerance of the predicted value (e.g., above maximum, below minimum, outside range, etc.) then one or more alerts may be generated. The alerts may be automatically generated and/or transmitted (e.g., by electronic notification) from the server(s) 36 to the customer device(s) 24 associated with the checkweighers 11 for which the alert is provided by way of non-limiting example.

Figure 9:
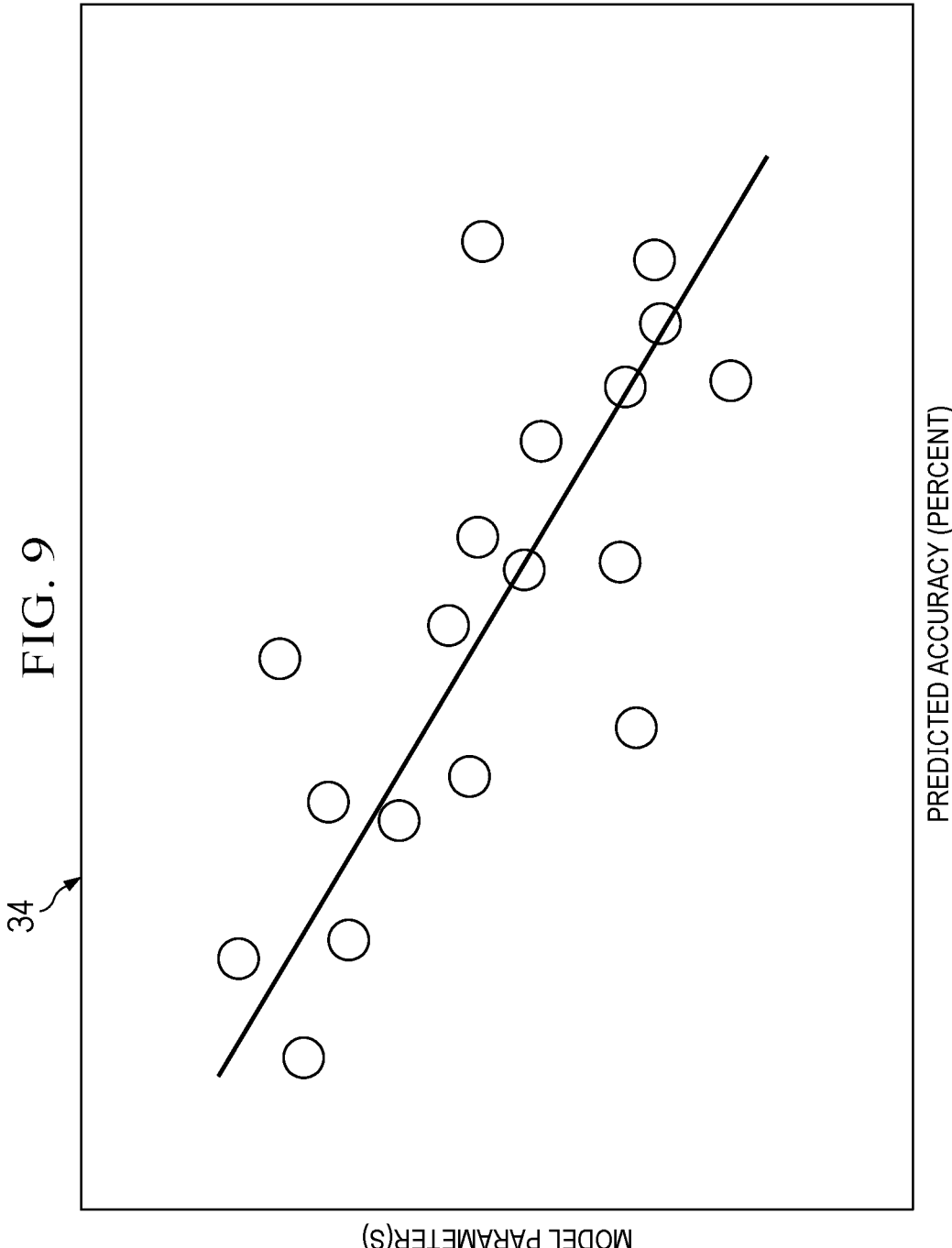
FIG. 9 is an exemplary graph and linear regression analysis of checkweigher accuracy data produced by the method of FIG. 8.

Predicted accuracy model information may be graphically displayed or represented, such as in the form of the graph of FIG. 9, by way of non-limiting example, which illustrates an exemplary linear regression analysis of the dataset to provide predicted accuracies for various checkweigher 11 configurations.

Figure 10:
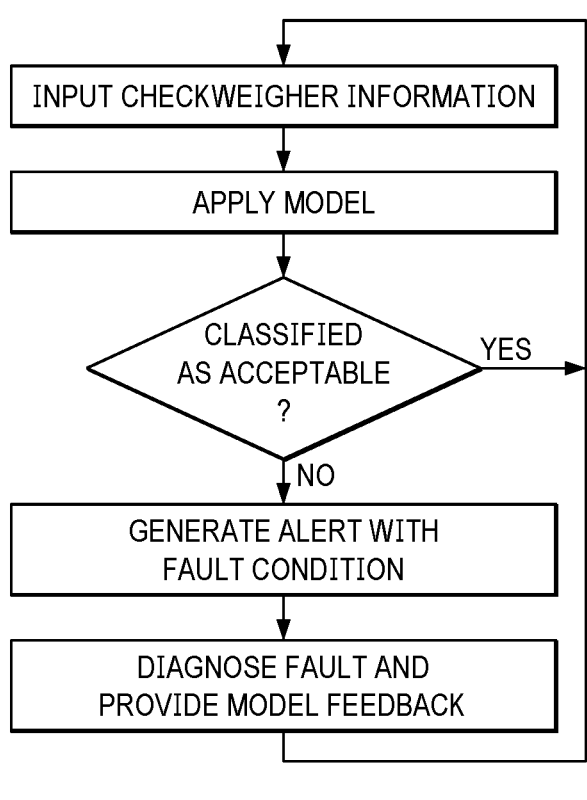
FIG. 10 is a flow chart with exemplary logic for predicting checkweigher fault condition from the checkweigher performance learning system.

As illustrated with particular regard to at least FIG. 10, alternatively or additionally, the system 10, such as but not limited to at the one or more servers 36, may be configured to receive the noise data and apply one or more models to classify conditions experienced, such as to identify and/or predict a root cause of noise. The datasets may comprise examples of noise data when various, known conditions exist and/or when only acceptable levels of noise exist. In this way, the software instructions, when executed, configure the one or more servers 36 to receive data and compare the received noise signature or other data to the stored examples. Where the received data is within a predetermined margin of one or more stored examples, the underlying, predicted root condition may be displayed or transmitted (e.g., acceptable, worn belt, unbalanced pulley, damaged loadcell, etc.). This analysis may be triggered where a received magnitude of the noise data for a given component of a given one of the checkweighers 11 is above the magnitude threshold for the given component. Such classification may be provided using one or more machine learning techniques.

These machine learning techniques may be used to improve subsequent classifications, such as by providing feedback to servers 36 to update the model(s) upon receipt of manually entered data regarding actually diagnosed conditions for the checkweighers 11. For example, without limitation, various weightings, classification criteria, magnitude thresholds 17, combinations thereof, or the like may be automatically adjusted by the one or more machine learning techniques after provided with such feedback and applied to subsequent classifications to improve the modeling.

The system 10 may be executed locally at a single checkweigher 11, such as based on information from the single checkweigher 11 and/or by way of a local controller(s) 28, or remotely, such as based on information from multiple checkweighers 11, such as by way of the server(s) 36.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A checkweigher performance learning system, said system comprising:

checkweighers, each comprising at least: a conveyor, a load cell, and a controller configured to:

generate noise data through a fast Fourier transform (FFT) trace of the load cell during operations of the checkweigher, wherein the FFT trace data comprises belt noise and pulley noise; and generate accuracy data through validation operations for the load cell; and one or more servers in electronic communication with the checkweighers and comprising historical operations data associated with known fault conditions and software instructions, which when executed, configure the one or more servers to:

receive configuration data for the checkweighers, said configuration data indicating pulley diameter, belt length, object type, belt speed, and frame configuration;

receive operations data from the checkweighers including the noise data and the accuracy data;

classify the noise data by component based on frequency of the noise data, wherein the components include at least a belt, a pulley, and a motor for each of the checkweighers;

correlate the accuracy data with magnitude values of the noise data on a component-specific basis to determine a magnitude threshold for each component providing acceptably accurate readings;

for each of the magnitude thresholds exceeded for a respective component of a respective checkweigher, classify the noise data for the respective component by comparison to known, fault conditions for the respective component to generate a predicted fault condition, including by matching the noise data associated with the exceeded magnitude threshold to a known fault condition in the historical operations data having a frequency and magnitude within a predetermined margin of the noise data associated with the exceeded magnitude threshold;

generate an alert comprising the predicted fault condition;

receive feedback regarding actual diagnosed conditions for the respective checkweigher; and update the predetermined margin based on the feedback using one or more machine learning techniques.

2. The system of claim 1 wherein:

the one or more servers are configured to determine the magnitude threshold for each component by performing a linear regression analysis of the noise data on a component-specific basis.

3. The system of claim 2 wherein:

the one or more servers are configured to receive user input regarding a proposed checkweigher configuration and generate a predicted accuracy for the proposed checkweigher configuration.

4. The system of claim 3 wherein:

the one or more servers are configured to generate the predicted accuracy for the proposed checkweigher configuration by:

performing a linear regression analysis of the correlated data; and fitting the proposed checkweigher configuration to the linear regression analysis to provide the predicted accuracy.

5. The system of claim 4 wherein:

the one or more servers are configured to generate an alert where accuracy data of one of the checkweighers having the proposed checkweigher configuration is below the predicted accuracy level by a predetermined margin.

6. The system of claim 1 further comprising:

user devices in electronic communication with the one or more servers, wherein the one or more servers are configured to publish an electronically sharable and editable table at the user devices on an on-demand basis, said table comprising the configuration data and the operations data for the checkweighers.

7. The system of claim 6 wherein:

the one or more servers are configured to:

receive additional configuration data and operations data for the checkweighers from the user devices; and update the table with the additional configuration data and operations data.

8. The system of claim 7 wherein:

the one or more servers are configured to:

receive known fault condition information for the checkweighers from the user devices;

update the table with the known fault condition information in association with at least certain of the configuration data and operations data; and establish magnitude classifications for the known fault conditions.

9. A method for predicting checkweigher accuracy, said method comprising:

electrically receiving configuration data for checkweighers, said configuration data indicating pulley diameter, belt length, object type, belt speed, and frame configuration;

performing a fast Fourier transform (FFT) trace of load cells of the checkweighers during operations comprising normal operations and accuracy validation operations to develop noise data and accuracy data for the checkweighers, wherein the FFT trace data comprises belt noise and pulley noise;

electronically classifying the noise data by component based on frequency; and correlating the accuracy data with magnitudes of the noise data to determine threshold magnitudes on a component-specific basis reflecting acceptably accurate readings;

for each of the magnitude thresholds exceeded for a respective component of a respective checkweigher, electronically classifying the noise data for the respective component by comparison to known, fault conditions for the respective component to generate a predicted fault condition, including by matching the noise data associated with the exceeded magnitude threshold to a known fault condition in the historical operations data having a frequency and magnitude within a predetermined margin of the noise data associated with the exceeded magnitude threshold, wherein said components including at least a belt, a pulley, and a motor for each of the checkweighers;

generating an alert comprising the predicted fault condition;

receiving feedback regarding actual diagnosed conditions for the respective checkweigher; and updating the predetermined margin based on the feedback using one or more machine learning techniques.

10. The method of claim 9 further comprising:

electronically receiving further noise data;

electronically classifying the further noise data by component based on frequency; and generating an alert where the further noise data includes a magnitude above the threshold for any of the components.

11. The method of claim 9 wherein:

the thresholds are determined by electronically performing a linear regression analysis of the noise data for each component.

12. The method of claim 9 further comprising:

performing a linear regression analysis of the correlated accuracy and configuration data;

receiving user input for a proposed checkweigher configuration; and generating a predicted accuracy for the proposed checkweigher configuration based on the linear regression analysis.

13. The method of claim 12 further comprising:

receiving accuracy data from an additional checkweigher having the proposed checkweigher configuration;

determining that the accuracy data from the additional checkweigher data is not within a predetermined margin of the predicted accuracy; and generating an alert indicating that the additional checkweigher is not performing with an expected level of accuracy.

14. The method of claim 9 further comprising:

receiving indicators of known fault conditions for at least some of the noise data;

receiving additional checkweigher noise data;

electronically classifying the additional checkweigher noise data by component based on frequency;

determining that the additional checkweigher noise data for any of the components is within a margin of the noise data associated with at least one of the known fault conditions for a given component; and generating an alert indicating the at least one of the known fault conditions is a likely fault condition for the additional checkweigher.

15. The method of claim 9 further comprising:

electronically publishing the accuracy data and the noise data in an editable table, wherein the configuration data is provided by manufacturers after creating the checkweighers, and the noise data is provided by a respective customer during use of checkweighers.

16. A checkweigher performance learning system, said system comprising:

checkweighers, each comprising at least: a conveyor, a load cell, a controller configured to perform a fast Fourier transform (FFT) trace of the load cell to derive noise data and perform a validation of the load cell to derive accuracy data, wherein the FFT trace data comprises belt noise and pulley noise;

user devices; and one or more servers in electronic communication with the controller each of the checkweighers and the user devices, said one or more servers comprising historical operations data associated with known fault conditions and software instructions, which when executed, configure the one or more servers to:

receive configuration data for the checkweighers from the user devices, said configuration data indicating pulley diameter, belt length, object type, belt speed, and frame configuration;

receive the noise data and the accuracy data from the controllers of the checkweighers;

classify the noise data by component based on frequency of the noise data, wherein the components include at least a belt, a pulley, and a motor for each of the checkweighers;

correlate the accuracy data with magnitudes of the noise data for each component;

publish the correlated data to an electronically sharable and editable spreadsheet;

receive known fault condition information from the user devices and update associated entries of the correlated data with the known fault information;

perform a linear regression analysis of the noise data for each component to develop a magnitude threshold for each component differentiating between the magnitudes associated with the accuracy data above a predetermined acceptable accuracy threshold and the magnitudes associated with the accuracy data below the predetermined acceptable accuracy threshold;

receive additional noise data; and:

classify the additional noise data by component based on frequency;

correlate the accuracy data with magnitude values of the noise data on a component-specific basis to determine a magnitude threshold for each component providing acceptably accurate readings:

for each of the magnitude thresholds exceeded for a respective component of a respective checkweigher, classify the noise data for the respective component by comparison to known, fault conditions for the respective component to generate a predicted fault condition, including by matching the noise data associated with the exceeded magnitude threshold to a known fault condition in the historical operations data having a frequency and magnitude within a predetermined margin of the noise data associated with the exceeded magnitude threshold:

generate an alert if the additional noise data incudes a magnitude above the magnitude threshold for any of the components; and include, in the alert, an indicator of a likely fault where the magnitude of the additional noise data for a given component is within a predetermined margin of a magnitude of the correlated data associated with one of the known fault conditions for the given component;

receive feedback regarding actual diagnosed conditions for the respective checkweigher; and update the predetermined margin based on the feedback using one or more machine learning techniques.

* * * * *